(12) United States Patent  (10) Patent No.: US 7,782,892 B2
Sun et al.  (45) Date of Patent: Aug. 24, 2010

(54) METHOD AND AN APPARATUS FOR CONSISTENCY VERIFICATION OF TRAFFIC ENGINEERING LINK TIMESLOT STATUS

(75) Inventors: Junbai Sun, Shenzhen (CN); Huadong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 11/553,044

(22) Filed: Oct. 26, 2006

(65) Prior Publication Data

US 2007/0098008 A1    May 3, 2007

(30) Foreign Application Priority Data

Oct. 28, 2005    (CN)    ......................... 2005 1 0100890

(51) Int. Cl.
*H04B 7/212*    (2006.01)
(52) U.S. Cl. ...................................... 370/442; 370/443
(58) Field of Classification Search ........................ None
See application file for complete search history.

(56) References Cited

U.S. PATENT DOCUMENTS

| | | | | |
|---|---|---|---|---|
| 6,914,877 | B1 * | 7/2005 | Alamineh | 370/217 |
| 6,975,588 | B1 * | 12/2005 | Katukam et al. | 370/222 |
| 6,975,613 | B1 * | 12/2005 | Johansson | 370/338 |
| 2003/0214969 | A1 * | 11/2003 | Cain et al. | 370/443 |
| 2004/0246954 | A1 * | 12/2004 | Yarger et al. | 370/371 |

FOREIGN PATENT DOCUMENTS

| | | |
|---|---|---|
| CN | 1494270 | 5/2004 |
| WO | WO02/28020 | 4/2002 |
| WO | WO2004/062315 | 7/2004 |

OTHER PUBLICATIONS

International Telecommunication Union (ITU), Architecture for the Automatically Switched Optical Network (ASON), G8080/Y.1304, Nov. 2001.*
Manzalini, Antonio et al., Architecture and Functional Requirements of Control Planes for Automatic Switched Optical Networks: Experience of the IST Project LION, IEEE Communications Magazine, Nov. 2002: pp. 60-65.*
Draft-ietf-ccamp-lmp-10. Link Management Protocol (LMP); J. Lang, Editor, 2003 1-60.

* cited by examiner

*Primary Examiner*—Huy D Vu
*Assistant Examiner*—Benjamin Lamont
(74) *Attorney, Agent, or Firm*—Occhiuti Rohlicek & Tsao LLP

(57) ABSTRACT

The present invention relates to a method and an apparatus for consistency verification of traffic engineering link timeslot status, including: the transmitting end transmits a timeslot status verification request message containing the timeslot status object class of a local end of a corresponding traffic engineering link to the receiving end; the receiving end compares and verifies the timeslot status object class of the transmitting end of the corresponding traffic engineering link with the timeslot status object class of the local end after the receiving end receives the message, and notifies a local end link resource manager of the result of verification and the timeslot status object class of the opposite end. With the method according to the embodiments of the present invention, the consistency of traffic engineering link timeslot statuses can be periodically detected, the inconsistency of traffic engineering link timeslot statuses can be discovered as early as possible.

20 Claims, 4 Drawing Sheets

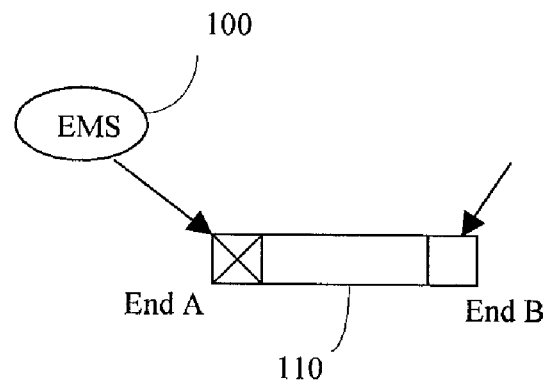
Prior Art
Fig. 1
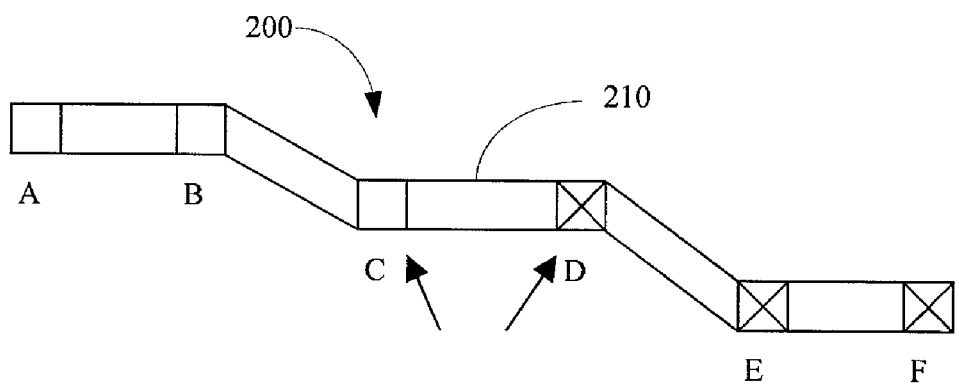
Prior Art
Fig. 2
| 0 | 7 | 15 | 23 | 31 |
|---|---|---|---|---|
| N | C-Type | Class | Length | |
| Object content | | | | |
Fig. 3

| 0 | 7 | 15 | 23 | 31 |
|---|---|---|---|---|
| Vers | Reserved | | Flags | Msg Type |
| LMP Length | | Reserved | | |

METHOD AND AN APPARATUS FOR CONSISTENCY VERIFICATION OF TRAFFIC ENGINEERING LINK TIMESLOT STATUS

RELATED APPLICATIONS

This application claims priority under 35 U.S.C. §119(a) to Chinese Patent Application No. 200510100890.4, filed Oct. 28, 2005, the entire contents of which are hereby incorporated by reference.

FIELD OF THE INVENTION

The present invention relates to the network transmission technologies, and particularly to a method and an apparatus for consistency verification of traffic engineering (TE) link timeslot status.

BACKGROUND OF THE INVENTION

ASON (Automatic Switching Optical Network) has the function of automatic discovery of network control topology and resource topology, on which basis, the automatic rerouting recovery in case of failure and the automatic reestablishment of end-to-end SC (Switched Connection) or SPC LSP (Soft Permanent Connection Label Switch Path) can be implemented.

Wherein the automatic discovery of resource topology is a critical premise, which relates to the discovery of local TE (Traffic Engineering) link and data link, and information flooding. The particular process includes:
1. discovering the local optical interfaces, establishing and maintaining the corresponding control channels;
2. performing link management, such as, connectivity verification of data link and consistency verification of TE link, etc.;
3. notifying other nodes of its information flooding after passing the consistency verification of the TE link;
4. establishing on each node a consistent TE link resource database for path calculation of LSP (Label Switch Path) establishment and rerouting recovery.

For the distributed ASON, the steps for LSP reestablishment and rerouting recovery are as follows:
1. calculating an LSP on the ingress node according to the obtained information of network resource topology by use of the traffic engineering based path algorithm;
2. allocating timeslot labels, reserving resources, and establishing cross-connection over the network element nodes along the LSP via the signaling protocol, wherein the allocation of timeslot labels is achieved by the local LRM (Link Resource Manager).

The timeslot statuses between the adjacent network elements should be kept consistent generally, but inconsistency between the adjacent network elements may occur in the following cases:

(1) The user configures the traditional static cross-connection on a single node by the EMS (Element Management Systems) as required, but only configures some timeslots occupying one end of the link and does not configure or reserve timeslots corresponding to the other end. As shown in FIG. 1, in the TE link 110, the EMS 100 configures the timeslot resource of the end A as occupied, while the timeslot of the end B is still configured as idle, which results in the inconsistency of the timeslot statuses on the two ends of the TE link.

(2) During deletion of an LSP, the LSP can not be deleted successfully because of an abnormal resetting of certain network element node, an the like, which results in the case that, the corresponding crossing of some network element nodes, generally upstream nodes, has been deleted, i.e., the timeslot resource of the corresponding TE link has been released, while the corresponding crossing of some other network element nodes, generally downstream nodes, is remained, i.e., the corresponding TE link timeslot resource is still occupied. As a result, the link timeslot statuses between the abnormally reset network element node and its adjacent node may be inconsistent. FIG. 2 shows a LSP 200 which ingress node is node A and egress node is node F, and the LSP 200 passes through the intermediate nodes B, C, D and E. The node D has been reset and restarted, on the nodes A, B and C the corresponding crossings have been deleted and the timeslot resources have been released, while D, E and F remain and the timeslot resources are still occupied. As a result, there is inconsistency of timeslot statuses of the two ends of the TE link 210 between C and D.

In the above two cases, (1) is an erroneous operation. The inconsistency of link timeslot statuses can be automatically eliminated by setting the other end, i.e. the end B in FIG. 1, as "occupied" by software. While (2) will inevitably occur in the distributed ASON, although the corresponding abnormity processing can be performed by use of the related existing technologies, the timeout of abnormity processing timeout timer is generally set much longer, so that the abnormal situation of the inconsistency of timeslot statuses of the two ends of TE link may last for a long time.

First, the inconsistency of timeslot statuses may cause the unavailability of the corresponding TE link timeslot, and result in the waste of TE link timeslot resources. Secondly, the inconsistency of timeslot statuses can have impact on the establishment of LSP, for example, when certain LSP establishment signaling reaches the network element node on the idle end, a crossing establishment failure will occur, thereby resulting in a failure of the current establishment process. Even if the LSP can be reestablished by means of the Crankback mechanism or other special processing, the total time is prolonged. If the LSP is established for rerouting recovery, the compact will be more severe.

Therefore, the abnormal situation of the inconsistency of TE link timeslot statuses should be detected, avoided and eliminated as early as possible.

At present, the main process of the inconsistency verification of TE link timeslot status in the prior art is as follows: Within the ASON networking, the timeslot status information of TE link of the entire networking is flooded, each node verifies the timeslot statuses of the two ends of each TE link connected with its adjacent nodes periodically by use of this information. If the inconsistency of timeslot statuses on the two ends is discovered, it will be identified specially so as to be avoided when the LSP establishes and allocates timeslot labels. If it is discovered that an originally occupied end becomes idle, the timeslot status of the other end specially identified may be modified as "idle", so that it can be reused when the LSP is established, thus avoiding the waste of resources.

In the above method, it is required for each node in the networking to flood the timeslot status information of all the TE links of this node. As a result, the amount of communication data is increased significantly. Since there may be the case that flooding refreshment is not in time, multiple continuous verifications are necessary for confirmation in order to avoid false verification, this may cause the detection processing to be not in time, thereby delaying the LSP establishment and rerouting recovery, and resulting in the waste of the TE link timeslot resources.

SUMMARY OF THE INVENTION

The embodiments of the present invention provide a method for consistency verification of traffic engineering link timeslot status.

The method for consistency verification of traffic engineering link timeslot status includes:

transmitting by a transmitting end a timeslot status verification request message containing timeslot status information of local end of a corresponding traffic engineering link to a receiving end;

comparing and verifying by the receiving end the timeslot status information of the transmitting end of the corresponding traffic engineering link with the timeslot status information of the local end after the receiving end receives the timeslot status verification request message.

An embodiment of the present invention provides an apparatus for consistency verification of timeslot status, for implementing the consistency verification of timeslot statuses of a local end and an opposite end, including:

a timeslot status verification request message constructing unit, for constructing a timeslot status verification request message containing timeslot status information of a local end of a corresponding traffic engineering link;

a timeslot status verification request message transmitting unit, for transmitting the timeslot status verification request message to an opposite end.

An embodiment of the present invention also provides an apparatus for consistency verification of timeslot status, including:

a timeslot status verification request receiving unit, for receiving a timeslot status verification request message from the opposite end;

a timeslot status information verifying unit, for comparing and verifying timeslot status information contained in the timeslot status verification request message with the timeslot status information of the local end.

In the present invention, the transmitting end transmits a timeslot status verification request message containing the timeslot status information of a local end of a corresponding traffic engineering link to the receiving end; the receiving end compares and verifies the timeslot status information of the transmitting end of the corresponding traffic engineering link with the timeslot status information of the local end after the receiving end receives the message, for further processing. As a result, the consistency of traffic engineering link timeslot statuses can be periodically detected, the inconsistency of traffic engineering link timeslot statuses can be discovered as early as possible so as to be eliminated. Therefore the impact of the inconsistency of timeslot statuses on the establishment of label switch path (LSP) and the automatic rerouting recovery can be prevented, and the connection survivability of the ASON networking can be improved.

BRIEF DESCRIPTION OF THE DRAWINGS

FIG. 1 shows a schematic diagram illustrating the inconsistency of TE link timeslot statuses in the prior art;

FIG. 2 shows a schematic diagram illustrating the abnormally occurred inconsistency of TE link timeslot statuses being deleted in LSP according to the prior art;

FIG. 3 shows the format of LMP object according to an embodiment of the present invention;

DETAILED DESCRIPTION OF THE EMBODIMENTS

Figures 4, 5:
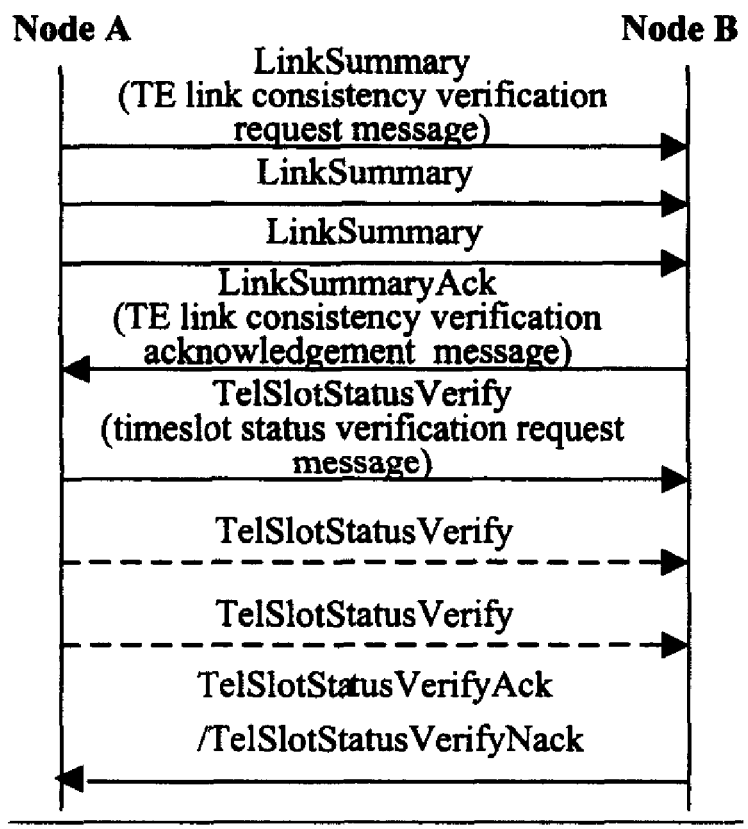
FIG. 4 shows the format of common header of an LMP message according to an embodiment of the present invention.
FIG. 5 shows a timing diagram of consistency verification of TE link timeslot statuses according to an embodiment of the present invention.

The present invention will be further detailed with reference to the accompanied drawings.

In order to ensure that the consistency verification be performed in time, the consistency verification of traffic engineering link timeslot status is performed between nodes according to the embodiments of the present invention. The node originating the verification procedure is called the transmitting end, and the corresponding node is called the receiving end.

The procedure of the implementation solution according to an embodiment of the present invention includes: the transmitting end transmits to the receiving end a timeslot status verification request message containing the timeslot status information of the local end of the corresponding traffic engineering link; the receiving end compares and verifies the timeslot status information of the transmitting end of the corresponding traffic engineering link with the timeslot status information of the local end on receiving the message.

After the comparison and verification, the receiving end carries out a series of subsequent operations, which include, but is not limited to, notifying the local end link resource manager of the results of the comparison and verification, in order to be processed correspondingly by the local end link resource manager; returning the corresponding information to the transmitting end, and the like.

On receiving the message fed back from the receiving end, the transmitting end may perform the corresponding operations, such as, comparing and verifying the timeslot status information of the receiving end contained in the message with the timeslot status information of the local end, notifying the local end link resource manager of the result of comparison and verification, and the like.

The consistency verification of traffic engineering link timeslot status can be performed after the consistency verification of traffic engineering link has been passed.

In one embodiment of the present invention, in consideration that the LMP (Link Management Protocol) has the functions of the establishment and maintenance of control channel, the consistency verification of TE link, the connectivity verification of data link, fault management, and the like, the LMP can be extended, that is, the object class and the message type may be extended, in order to add a function of periodic consistency verification of TE link timeslot status. The detailed solution is described as follows.

(1) The Extension of Object Type

FIG. 3 shows the format of an object in an LMP common data packet.

Wherein,

N: indicates whether the object is negotiable or nonnegotiable; N=1: negotiable; N=0: nonnegotiable; its length is 1 bit;

C-Type: represents the subtype of a Class, and is unique in a same Class; its length is 7 bits;

Class: represents the object class; its length is 8 bits;

Length: indicates the length in bytes of an object, including the fields of N, C-Type, Class and Length, etc.; its length is 16 bits.

In an embodiment of the present invention, on the basis of the existing 15 types of (1-14 and 20) Class, a TE link timeslot status object class which requires verification, i.e., TELSLOT_STATUS, is added. The TELSLOT_STATUS is defined as follows:

Class=15

Wherein the granularity of each timeslot depends on C-Type, and the corresponding relationship is:
C-type=1, VC4
C-type=2, 2VC4
C-type=3, 4VC4
C-type=4, 8VC4
C-type=5, 16VC4
C-type=6, 32VC4
C-type=7, 64VC4

Wherein, the content of the object class includes all the timeslot statuses of the corresponding TE link; the granularity of each timeslot depends on C-Type, for example, if C-type=3, the granularity of the timeslot is 4VC4.

The content of the timeslot status object class includes 4 timeslot statuses:

0—idle

1—static cross-connection occupied

2—SPC(Soft Permanent Connection) or SC(Switched connection) occupied

3—customized special status (for special processing and future extension)

Wherein, the customized special status can be further detailed as reserved status, tunnel (FA) service occupied status, etc.

Therefore, in the above case, each timeslot status can be represented by 2 bits. For example, a TE link with the bandwidth of 2.5 G has 16 VC4 timeslots, its first timeslot is in the SPC or SC occupied status, the eighth timeslot is in the static cross-connection occupied status, and the rest are in idle status. When C-type=1, its object can be represented by 10000000000000010000000000000000, Length is 4 bytes.

(2) The Extension of Message Type

FIG. 4 shows the format of the common header of LMP common data packet.

Wherein,

Vers: the number of protocol version; its length is 4 bits;

Flags: value=1 indicates control channel down, value=2 indicates LMP restarts, the others can be ignored; its length is 8 bits;

LMP Length: the total length (in bytes) of an LMP message, which includes Common Header and any subsequent object with arbitrary alterable length; its length is 16 bits;

Msg Type: message type; its length is 8 bits, 20 types has been defined up to now:
1=Config
2=ConfigAck
3=ConfigNack
4=Hello
5=BeginVerify
6=BeginVerifyAck
7=BeginVerifyNack
8=EndVerify
9=EndVerifyAck
10=Test
11=TestStatusSuccess
2=TestStatusFailure
13=TestStatusAck
14=LinkSummary
15=LinkSummaryAck
16=LinkSummaryNack
17=ChannelStatus
18=ChannelStatusAck
19=ChannelStatusRequest
20=ChannelStatusResponse In an embodiment of the present invention, on the basis of the above existing message types (Msg Type), 3 types of fault management message are added:
21=TelSlotStatusVerify
22=TelSlotStatusVerifyAck
23=TelSlotStatusVerifyNack The formats of these 3 types of message are as follows respectively:

<TelSlotStatusVerify Message>::=<Common Header><TELSLOT_STATUS>

<TelSlotStatusVerifyAck Message>::=<Common Header><TELSLOT_STATUS>

<TelSlotStatusVerifyNack Message>::=<Common Header><TELSLOT_STATUS>

The above 3 fault management messages respectively are: a timeslot status verification request message, a consistency acknowledgement message of timeslot status verification, and an inconsistency acknowledgement message of timeslot status verification. All of the 3 messages contain the timeslot status object class of the local end of TE link, i.e., TELSLOT_STATUS Class. Wherein, the latter two messages distinguish the results of verification by the message type (Msg Type) in the common header of a message packet, i.e., the types 22, 23 among the above types of fault management message.

(3) The Extension of Processing Procedure

In an embodiment of the present invention, the consistency verification of TE link timeslot status is performed after the consistency verification of TE link is performed and passed.

Refer to FIG. 5, which is a timing diagram of consistency verification of TE link timeslot status, wherein LinkSummary is a TE link consistency verification request message, LinkSummaryAck is a consistency acknowledgement message of TE link verification.

Figure 6:
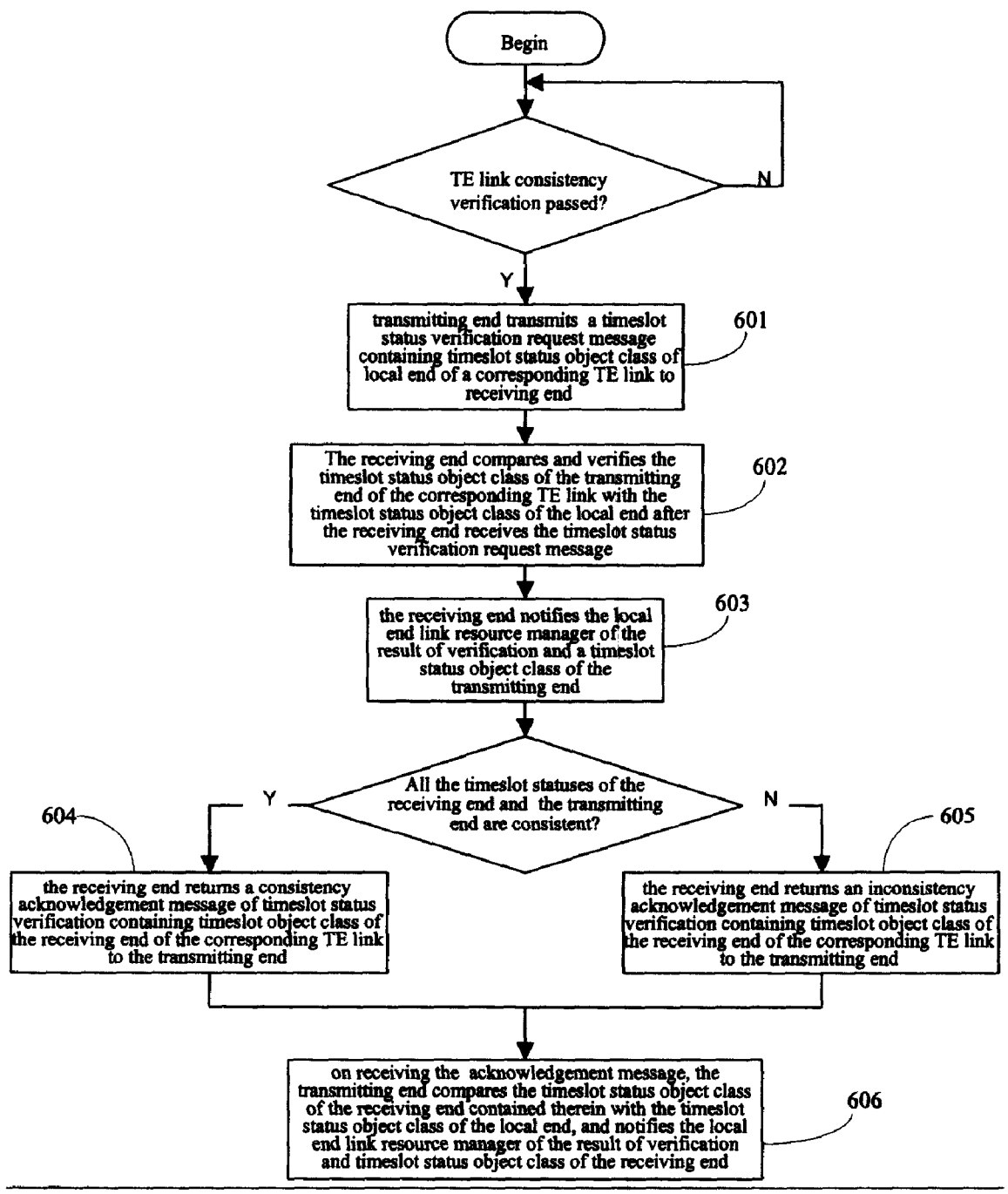
FIG. 6 shows the flow chart of consistency verification of TE link timeslot statuses according to an embodiment of the present invention.
Figure 7:
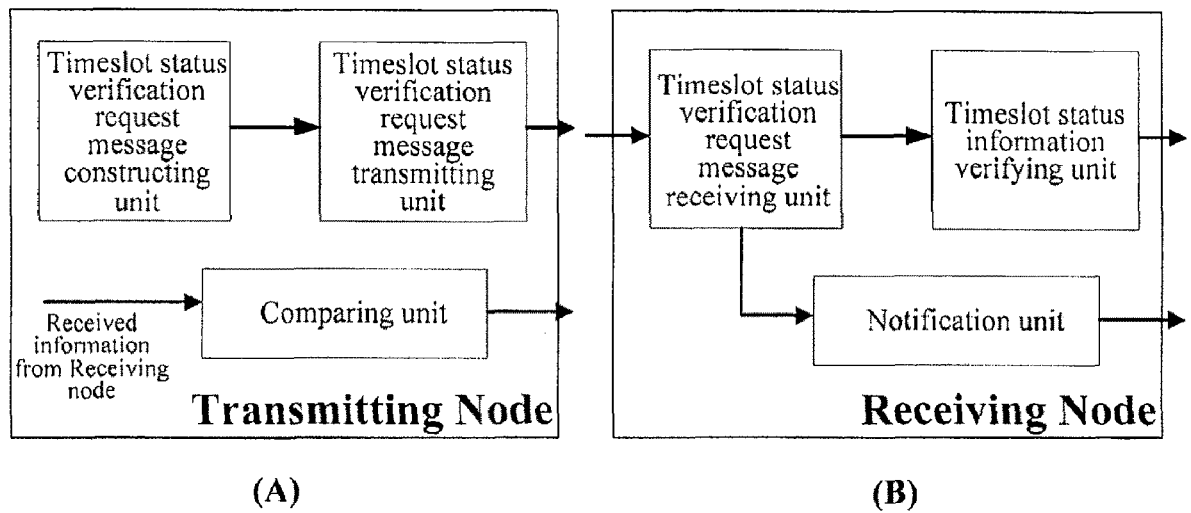
FIG. 7 is a block diagram of a transmitting node and a receiving node that cooperate to carry out the procedure illustrated in FIG. 6.
Figure 8:
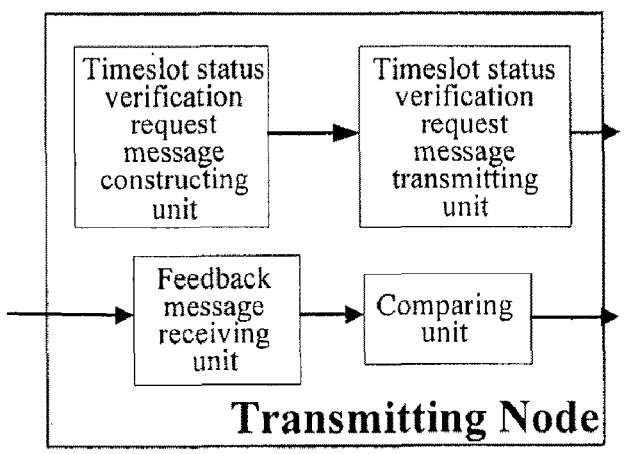
FIG. 8 shows a transmitting node similar to that shown in FIG. 7 but with the addition of a feedback message receiving unit.

Also refer to FIG. 6, which is the detailed flow chart of consistency verification of TE link timeslot status. Suppose that the node A in FIG. 5 is the transmitting end in FIG. 6; the node B in FIG. 5 is the receiving end in FIG. 6, the detailed process of consistency verification of TE link timeslot status is as follows:

601. The node A transmits to the node B a TelSlotStatusVerify message (a timeslot status verification request message) containing the TELSLOT_STATUS Class (the timeslot status object class) of the local end of the corresponding TE link, after the consistency verification of TE link is performed and passed;

602. On receiving the TelSlotStatusVerify message transmitted by the node A, the node B compares and verifies the TELSLOT_STATUS Class of the node A with the TELSLOT_STATUS Class of the node B;

603. The node B notifies the local end link resource manager of the result of verification and TELSLOT_STATUS Class of the node A, so that the local end LRM (link resource manager) can perform further processing;

Next, the node B returns an acknowledgement message to the node A, wherein:

604. if all the timeslot statuses of the nodes A and B are consistent, the node B returns to the node A a TelSlotStatusVerifyAck message (consistency acknowledgement message of timeslot status verification) containing the TELSLOT_STATUS Class of the node B of the corresponding TE link;

605. if not all the timeslot statuses of the nodes A and B are inconsistent, the node B returns to the node A a TelSlotStatusVerifyNack message (inconsistency acknowledgement message of timeslot status verification) containing the TELSLOT_STATUS Class of the node B of the corresponding TE link;

606. On receiving the TelSlotStatusVerifyAck message or the TelSlotStatusVerifyNack message returned by the node B, the node A compares the TELSLOT_STATUS Class of the node B contained in the message with the TELSLOT_STATUS Class of the node A, and notifies the local end LRM (link resource manager) of the result of verification and the TELSLOT_STATUS Class information of the receiving end, so that the local end LRM can perform further processing.

Refer to FIG. 5 again, after the node A transmits the TelSlotStatusVerify message to the node B, if the node A does not receive the TelSlotStatusVerifyAck message or the TelSlotStatusVerifyNack message returned from the node B within a certain time, the node A will retransmit the TelSlotStatusVerify message a predefined number of times within a predefined time period, the length of the time period and the number of times may be predefined according to the condition of network and the requirements of user. If the TelSlotStatusVerifyAck message or the TelSlotStatusVerifyNack message can not be received even after the retransmission, the node A stops the retransmission, to continue the next consistency verification of TE link.

On receiving the result messages of TE link timeslot status verification, the LRM of the transmitting end and the LRM of the receiving end can save the results of verification contained in the messages for query and maintenance. Further, the LRM of the transmitting end and the LRM of the receiving end may compare and process the TELSLOT_STATUS Class of the opposite end and the TELSLOT_STATUS Class of the local end according to the actual requirements of user, for example, the customized special status therein can be processed. The LRMs may also report an alarm and notify the user of the inconsistency of timeslot statuses of two ends of the TE link. Of course, The LRMs can automatically eliminate the inconsistency of timeslot statuses of two ends of the TE link.

On discovering the inconsistency of timeslot statuses of the two ends of TE link by means of querying and the alarm, the user can eliminate the inconsistency of link status by delivering a command.

Two apparatus for consistency verification of timeslot status are provided in the embodiments of the present invention, which can be applied to the transmitting end and the receiving end respectively.

When applied to the transmitting end, the apparatus for consistency verification of timeslot status according to an embodiment of the present invention includes:

a timeslot status verification request message constructing unit, for constructing a timeslot status verification request message containing the timeslot status information of the local end of a corresponding traffic engineering link;

a timeslot status verification request message transmitting unit, for transmitting the timeslot status verification request message to the opposite end.

In yet another embodiment, the apparatus also includes:

a feedback message receiving unit, for receiving a consistency acknowledgement message of timeslot status verification or an inconsistency acknowledgement message of timeslot status verification from the opposite end.

In another embodiment, the apparatus also includes:

a comparing unit, for comparing the timeslot status information of the receiving end contained in the consistency acknowledgement message of timeslot status verification or in the inconsistency acknowledgement message of timeslot status verification with the timeslot status information of the local end, and notifying the local end link resource manager (LRM) of the result of verification and timeslot status object class of the receiving end.

When applied to the receiving end, the apparatus for consistency verification of timeslot status according to an embodiment of the present invention includes:

a timeslot status verification request receiving unit, for receiving the timeslot status verification request message from the opposite end;

a timeslot status information verifying unit, for comparing and verifying the timeslot status information contained in the timeslot status verification request message with the timeslot status information of the local end.

In another embodiment, the apparatus also includes:

a message feedback unit, for feeding back a consistency acknowledgement message of timeslot status verification or an inconsistency acknowledgement message of timeslot status verification to the opposite end.

In yet another embodiment, the apparatus also includes:

a notifying unit, for notifying the local end link resource manager (LRM) of the result of verification and the timeslot status object class of the transmitting end.

While the present invention has been illustrated and described with reference to some preferred embodiments, the present invention is not limited to these. Those skilled in the art should recognize that various variations and modifications can be made without departing from the spirit and scope of the present invention as defined by the accompanied claims.

What is claimed is:

1. A node apparatus for consistency verification of timeslot statuses, for implementing consistency verification of timeslot status of a receiving end and a transmitting end of a traffic engineering link, the node apparatus being disposed at the receiving end, comprising:

a timeslot status verification request receiving unit, for receiving a timeslot status verification request message from the transmitting end;

a timeslot status information verifying unit, for comparing statuses of all timeslots comprising timeslot status information of the transmitting end contained in the timeslot status verification request message with statuses of corresponding timeslots of the receiving end, to verify whether the statuses of all timeslots comprising the timeslot status information of the transmitting end are consistent with those of the receiving end, and reporting an alarm if status of any one of the timeslots of the transmitting end is inconsistent with that of the corresponding timeslot of the receiving end; and a notification unit, for transmitting, in response to receiving the timeslot status verification request message, timeslot status information of the receiving end to the transmitting end.

2. The node apparatus according to claim 1, further comprising:

a message feedback unit, for feeding back a consistency acknowledgement message of timeslot status verification or an inconsistency acknowledgement message of the timeslot status verification to the transmitting end.

3. The node apparatus according to claim 1, wherein:
the notifying unit is further configured for notifying a local end link resource manager (LRM) of the result of verification and the timeslot status object class of the transmitting end.

4. A system for verification of consistency between timeslot statuses of a traffic engineering link, said system comprising
a receiving node disposed at a first end of the traffic engineering link, and
a transmitting node disposed at a second end of the traffic engineering link,
wherein the transmitting node comprises:
a timeslot status verification request message constructing unit, for constructing a timeslot status verification request message containing timeslot status information of a transmitting end of a corresponding traffic engineering link; and
a timeslot status verification request message transmitting unit, for transmitting the timeslot status verification request message to a receiving end of the corresponding traffic engineering link,
and wherein the receiving node comprises:
a timeslot status verification request receiving unit, for receiving the timeslot status verification request message from the transmitting end;
a timeslot status information verifying unit, for comparing the statuses of all timeslots comprising the timeslot status information of the transmitting end with statuses of corresponding timeslots of the receiving end, to verify whether the statuses of all timeslots comprising the timeslot status information of the transmitting end are consistent with those of the receiving end, and reporting an alarm if a status of any one of the timeslots of the transmitting end is inconsistent with that of the corresponding timeslot of the receiving end; and
a notification unit, for transmitting, in response to receiving the timeslot status verification request message, timeslot status information of the receiving node to the transmitting node; and
wherein the transmitting node further comprises a comparing unit, for
comparing statuses of all timeslots in the timeslot status information of the receiving node with statuses of corresponding timeslots of the transmitting node to verify whether the statuses of all timeslots in the timeslot status information of the receiving node are consistent with those of the transmitting node, and reporting an alarm if a status of any one of the timeslots of the receiving node is inconsistent with that of the corresponding timeslot of the transmitting node.

5. The system according to claim 4, wherein the transmitting node further comprises:
a feedback message receiving unit, for receiving a consistency acknowledgement message of timeslot status verification or an inconsistency acknowledgement message of timeslot status verification from the receiving node.

6. The system according to claim 5, wherein the the timeslot status information of the receiving node is contained in the consistency acknowledgement message of timeslot status verification or the inconsistency acknowledgement message of timeslot status verification sent from the receiving node, and wherein
the comparing unit is further configured for
comparing the timeslot status information of the receiving node with timeslot status object class of the transmitting node, and
notifying a receiving end link resource manager (LRM) of the result of verification and the timeslot status object class of the receiving end.

7. A method for consistency verification of traffic engineering link timeslot status, said method comprising:
transmitting, by a transmitting end, to a receiving end, a timeslot status verification request message containing timeslot status information of the transmitting end of a corresponding traffic engineering link;
comparing, by the receiving end,
statuses of all timeslots comprising the timeslot status information of the transmitting end of the corresponding traffic engineering link
with
statuses of corresponding timeslots of the receiving end after the receiving end receives the timeslot status verification request message
to verify whether the statuses of all timeslots in the timeslot status information of the transmitting end are consistent with those of the receiving end, and
reporting an alarm if a status of any one of the timeslots of the transmitting end is inconsistent with that of the corresponding timeslot of the receiving end;
in response to receiving the timeslot status verification request message, transmitting, by the receiving end, to the transmitting end, timeslot status information of the receiving end;
comparing, by the transmitting end,
statuses of all timeslots in the timeslot status information of the receiving end
with
statuses of corresponding timeslots of the transmitting end to verify whether the statuses of all timeslots in the timeslot status information of the receiving end are consistent with those of the transmitting end, and
reporting an alarm if a status of any one of the timeslots of the receiving end is inconsistent with that of the corresponding timeslot of the transmitting end.

8. The method according to claim 7, wherein after either one of the verifying steps, the method further comprises:
the receiving end notifying a receiving end link resource manager of
the result of verification and
a timeslot status object class of the transmitting end.

9. The method according to claim 7, wherein after the verifying, the method further comprises:
transmitting, by the receiving end, a feedback message to the transmitting end.

10. The method according to claim 9, wherein the process of transmitting a feedback message to the transmitting end comprises:
if the timeslot status of the receiving end and the timeslot status of the transmitting end are consistent, returning a consistency acknowledgement message of timeslot status verification by the receiving end to the transmitting end;
if the timeslot status of the receiving end and the timeslot status of the transmitting end are inconsistent, returning an inconsistency acknowledgement message of timeslot status verification by the receiving end to the transmitting end.

11. The method according to claim 10, further comprising:
on receiving the feedback message returned from the receiving end, comparing, by the transmitting end,
the timeslot status information of the receiving end contained in the feedback message with
the timeslot status information of the transmitting end, and notifying a transmitting end link resource manager of the result of verification and timeslot status object class of the receiving end.

12. The method according to claim 8, further comprising at least one of:
saving the received result of verification by the link resource manager; and in case the timeslot statuses of the transmitting end and the receiving end of the traffic engineering link are inconsistent, reporting an alarm or automatically eliminating, by the link resource manager, the inconsistency between timeslot statuses of the transmitting end and timeslot statuses of the receiving end of the traffic engineering link.

13. The method according to claim 11, further comprising at least one of:
saving the received result of verification by the link resource manager; and in case the timeslot statuses of the transmitting end and the receiving end of the traffic engineering link are inconsistent, reporting an alarm or automatically eliminating, by the link resource manager, the inconsistency between timeslot statuses of the transmitting end and timeslot statuses of the receiving end of the traffic engineering link.

14. The method according to claim 12, further comprising:
on querying the information in the link resource manager, or, on receiving the alarm of the link resource manager, delivering a command by the user to eliminate the inconsistency between timeslot statuses of the transmitting end and the receiving end of the traffic engineering link.

15. The method according to claim 13, further comprising:
on querying the information in the link resource manager, or, on receiving the alarm of the link resource manager, delivering a command by the user to eliminate the inconsistency between timeslot statuses of the transmitting end and the receiving end of the traffic engineering link.

16. The method according to claim 8, further comprising:
further comparing the timeslot statuses of the transmitting end and the receiving end of the traffic engineering link by the link resource manager.

17. The method according to claim 11, further comprising:
further comparing the timeslot statuses of the transmitting end and the receiving end of the traffic engineering link by the link resource manager.

18. The method according to claim 7, wherein the consistency verification of the traffic engineering link has been passed before the transmitting end transmits the timeslot status verification request message containing the timeslot status information of the transmitting end of the corresponding traffic engineering link to the receiving end.

19. The method according to claim 7, wherein
the timeslot status information of the traffic engineering link is represented by a timeslot status object class in a common data packet of link management protocol;

the timeslot status verification request message is a fault management message in the common data packet of link management protocol.

20. The method according to claim 19, wherein the content of the timeslot status object class comprises:
idle status, static cross-connection occupied status, soft permanent connection or switched connection occupied status.

* * * * *